United States Patent [19]

Zollinger

[11] Patent Number: 4,649,253

[45] Date of Patent: Mar. 10, 1987

[54] APPARATUS FOR BUTT WELDING AUTOMOTIVE WHEEL RIM BLANKS

[75] Inventor: Hans R. Zollinger, Geroldswil, Switzerland

[73] Assignee: H. A. Schlatter AG, Schlieren, Switzerland

[21] Appl. No.: 769,682

[22] Filed: Aug. 27, 1985

[30] Foreign Application Priority Data

Sep. 4, 1984 [DE] Fed. Rep. of Germany ....... 3432488

[51] Int. Cl.$^4$ ............................................. B23K 11/02
[52] U.S. Cl. .................................... 219/101; 219/59.1
[58] Field of Search ................ 219/59.1, 67, 101, 102, 219/104

[56] References Cited

U.S. PATENT DOCUMENTS 2,713,626 7/1955 Lewis .................................. 219/101
4,187,406 2/1980 Fencl et al. ........................ 219/59.1
4,562,326 12/1985 Tan et al. ............................ 219/59.1

FOREIGN PATENT DOCUMENTS 3148895 6/1983 Fed. Rep. of Germany ...... 219/104

Primary Examiner—E. A. Goldberg
Assistant Examiner—C. M. Sigda
Attorney, Agent, or Firm—Werner W. Kleeman

[57] ABSTRACT

The apparatus possesses work locating fixtures or clamping devices for clamping edge areas of hollow cylindrical blanks as well as a facility for pressing together the mutually confronting edges of axial slits of the blanks. One of the jaws of each work locating fixture or clamping device is connected to a source of welding current. To prevent substantial elastic deformations of the apparatus caused by the very high clamping forces of the work locating fixtures or clamping devices as well as compression forces before, during and after welding and to render possible a feeding and removing of the blanks or wheel rim hoops, transverse to the axis of the blanks, each work locating fixture or clamping device possesses two movable clamp or pincer-type partial jaw members which cooperate with an associated fixed clamping jaw. These partial jaw members act axially from both sides toward the inner circumference of the blank and their pivotal movements are independent of their essentially linear advance or approach motion toward the associated fixed clamping jaw.

6 Claims, 4 Drawing Figures

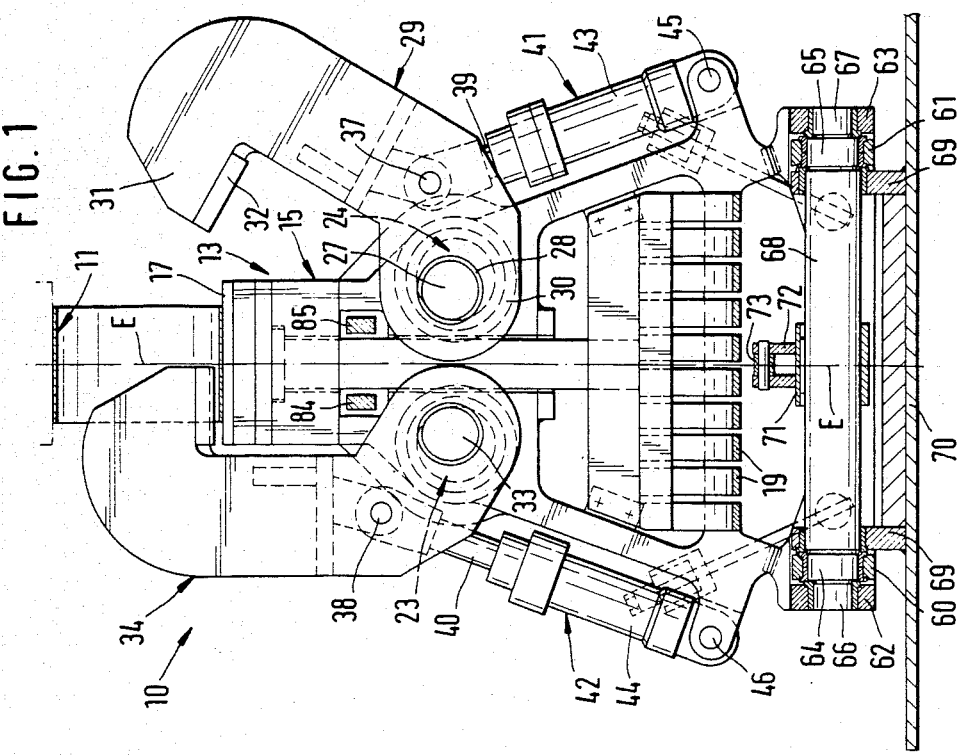
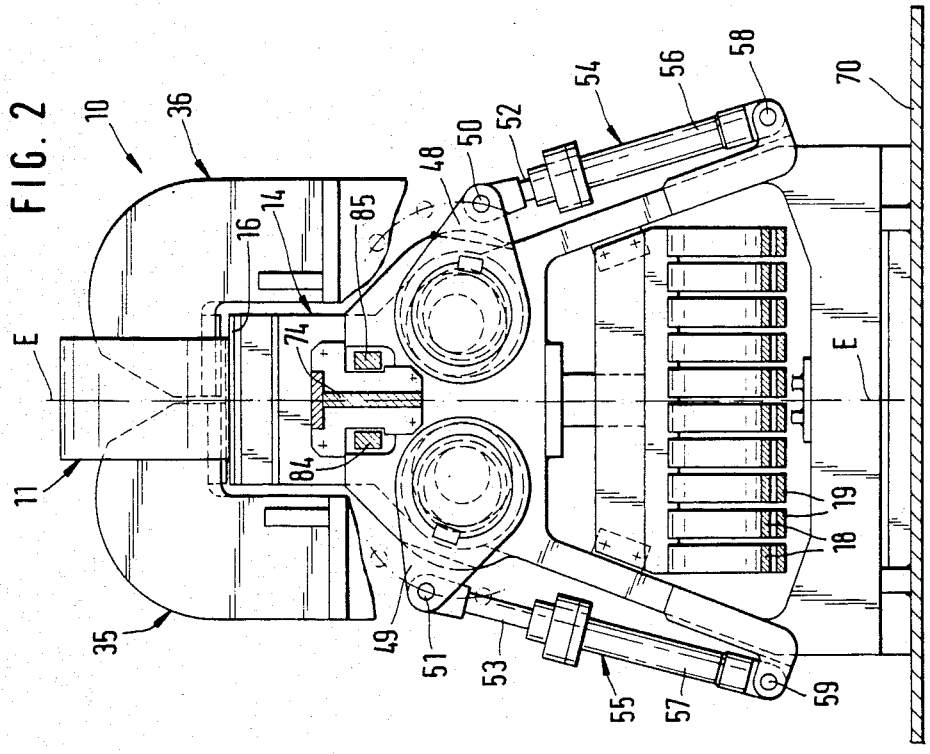

APPARATUS FOR BUTT WELDING AUTOMOTIVE WHEEL RIM BLANKS

BACKGROUND OF THE INVENTION

The present invention broadly relates to a new and improved apparatus for butt welding of hollow cylindrical and longitudinally or axially slit blanks to form wheel rim hoops.

Generally speaking, the apparatus for butt welding of hollow cylindrical and longitudinally or axially slit blanks to form wheel rim hoops comprises means for pressing together the mutually confronting edges of the longitudinal or axial slits of the hollow cylindrical blanks. Clamping devices or work locating fixtures are associated with each region of the hollow cylindrical blanks adjoining the axial slit and are used for fixedly clamping each region and for conducting an electrical current to each region. Each clamping device of the clamping devices comprises a first fixed clamping jaw and a second movable clamping jaw. There is provided a source of electrical welding current. The first fixed clamping jaw is connected to the source of electrical welding current. Each hollow cylindrical blank has an inner circumference and the second movable clamping jaw is intended to engage one hollow cylindrical blank at a time at the inner circumference. The second movable clamping jaw is movable toward and away from the first fixed clamping jaw.

Such an arrangement, for example, is known from U.S. Pat. No. 2,713,626, granted July 19, 1955.

In this prior art apparatus each of the two work locating fixtures possesses a movable clamping jaw which with its associated fixed clamping jaw forms a type of "alligator" mouth into which the blank is to be pushed in a direction parallel to its axis. The closing movement of the movable clamping jaw onto or toward its associated fixed clamping jaw is a pivotal movement with the result that the specific contact pressure is not necessarily always uniform over the whole clamping surface. Consequently the welding current has to overcome different transition resistances which can lead to unwanted local heating in the region of the welding joint to be fabricated. Since the blanks additionally have to be brought to the clamping jaws by means of an axial movement and again have to be removed from the clamping jaws by an opposite axial movement, the feeding and removal of the workpieces in the prior art apparatus is either possible only by hand or only with a considerable technical effort. If the prior art apparatus is to be rebuilt for automatic operation it would require a robot-type apparatus for the feed and removal of the blanks.

For the sake of completeness it should be mentioned that a similar arrangement is known from British Pat. No. 1,556,556 although from non-analogous art. The arrangement forms a station in a production line of a number of stations that are described in this British patent. Strips of metal, precut to an exact length, are fed to the first station and bent by bending rolls into longitudinally slit blanks. There extends through all stations of the production line a guide pin which is anchored at only one side of the first station and along which the blanks are axially driven, a step at a time, by rhythmically reciprocating grippers or grabs from station to station. The second station of the production line is a stamping station which in the present connection is only of interest insofar as the female dies associated with the male stamping or pressing dies or punches are anchored in the region of the stamping station on the aforementioned guide pin.

The third station is the welding station and, considered alone, corresponds to the aforementioned similar apparatus of U.S. Pat. No. 2,713,626. However, the fixed clamping jaws of this welding station are fixed to the guide pin and the movable clamping jaws act from the outer circumference on to the edge area bordering the longitudinal slit of the blank.

SUMMARY OF THE INVENTION

Therefore, with the foregoing in mind it is a primary object of the present invention to provide a new and improved apparatus for butt welding of hollow cylindrical and longitudinally or axially slit blanks to form wheel rim hoops or the like and which apparatus does not exhibit the aforementioned drawbacks and shortcomings of the prior art constructions.

A further important object of the present invention is to provide an apparatus of the above mentioned type in which the clamping force on the edge region of the blank is distributed practically uniformly.

A yet further important object of the present invention is to provide an apparatus in which it is possible to feed the blank to and to remove the blank from the apparatus by means of a simple stepwise operating conveyor or transport device which is always driven in the same direction.

Now in order to implement these and still further objects of the invention, which will become more readily apparent as the description proceeds, the apparatus of the present invention for butt welding of hollow cylindrical and longitudinally or axially split blanks to form wheel rim hoops is manifested by the features that each second movable clamping jaw comprises two partial jaw members. The two partial jaw members have a pincer configuration and are axially pivotable into the inner circumference of each hollow cylindrical blank from both sides thereof with a pivoting motion and this pivoting motion is independent of a substantially linear advance or approach motion of these two partial jaw members toward their associated first fixed clamping jaw.

In the proposed inventive apparatus a fundamentally different concept is realized. The dimensions and thus the rigidity of the fixed clamping jaws are not limited by the dimensions of the blanks. The movable clamping jaws of each of the two clamping devices or work locating fixtures possess two partial jaw members which are advantageously constructed mirror-symmetrically and are pivoted into the blank axially from both sides and then are closed in an essentially straight-line or linear movement toward the fixed clamping jaws. One advantage is that in the released position of the partial jaw members, the blanks or the welded wheel rim hoops are freely accessible and thereby can be fed in or removed transversely to their axes. Another advantage is that in the clamping position of the partial jaw members the specific clamping force is distributed more evenly and essentially more symmetrically.

BRIEF DESCRIPTION OF THE DRAWINGS

The invention will be better understood and objects other than those set forth above, will become apparent when consideration is given to the following detailed description thereof. Such description makes reference FIG. 1 schematically shows a transverse section through the apparatus along the line I—I of FIG. 3 in which the one partial jaw member (the right-hand jaw member) is shown in the swivelled or swung out position and the other partial jaw member (the left-hand jaw member) is shown in the engaged or swung in position (although not yet in the clamping position);

FIG. 2 schematically shows a section along the line II—II of FIG. 3, wherein the two partial jaw members (of which the left partial jaw member is in the clamping position) are shown in fragmentary view;

DETAILED DESCRIPTION OF THE PREFERRED EMBODIMENTS

Figure 3:
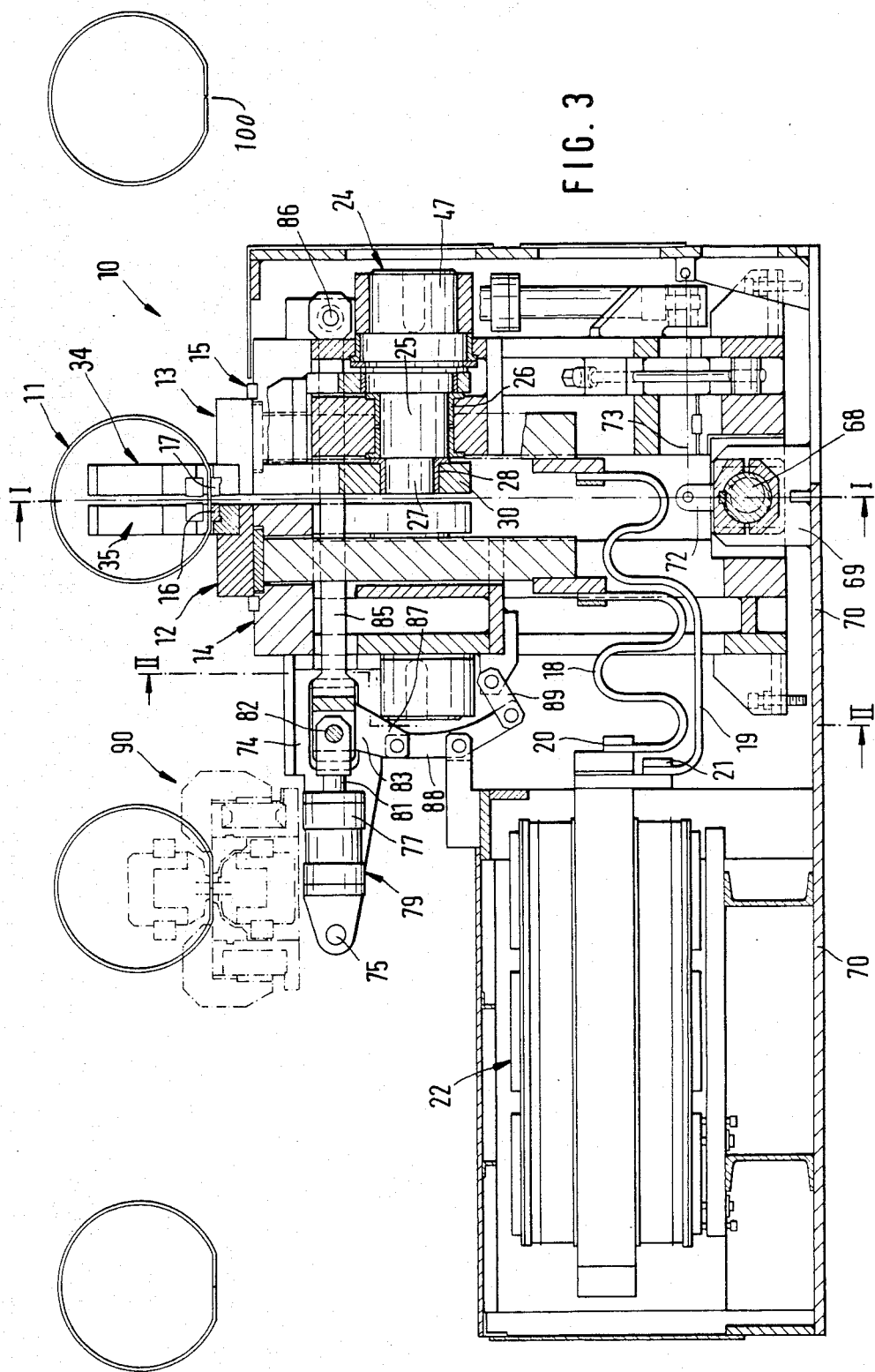
FIG. 3 schematically shows a vertical longitudinal section along the line III—III of FIG. 4.

Describing now the drawings, it is to be understood that to simplify the showing thereof, only enough of the structure of the exemplary embodiment of the apparatus for butt welding of hollow cylindrical and longitudinally or axially slit blanks to form wheel rim hoops or the like has been illustrated therein as is needed to enable one skilled in the art to readily understand the underlying principles and concepts of the present invention. Turning now specifically to FIGS. 1 and 2 of the drawings, the structure depicted by way of example and not limitation therein will be seen to comprise an apparatus 10 in which there is recognizable a blank 11 ready for processing in the apparatus 10. The blank 11—as is usual in the fabrication of wheel rim hoops—possesses essentially the shape of a longitudinally or axially slit hollow cylinder (the longitudinal or axial slit, 1000 is not visible in FIGS. 1 and 2 but is shown in FIG. 3). The edge regions of the blank 11 bordering the longitudinal or axial slit 100 are somewhat flattened.

These blanks 11 are fed singly to the apparatus 10 by a not particularly shown progressively or incrementally operating conveyor means or transport device transverse to the axial orientation of the blanks 11 and, as shown in FIG. 3, are subsequently conveyed, evenly spaced from one another, away from the apparatus 10 by the same or related means.

Figure 4:
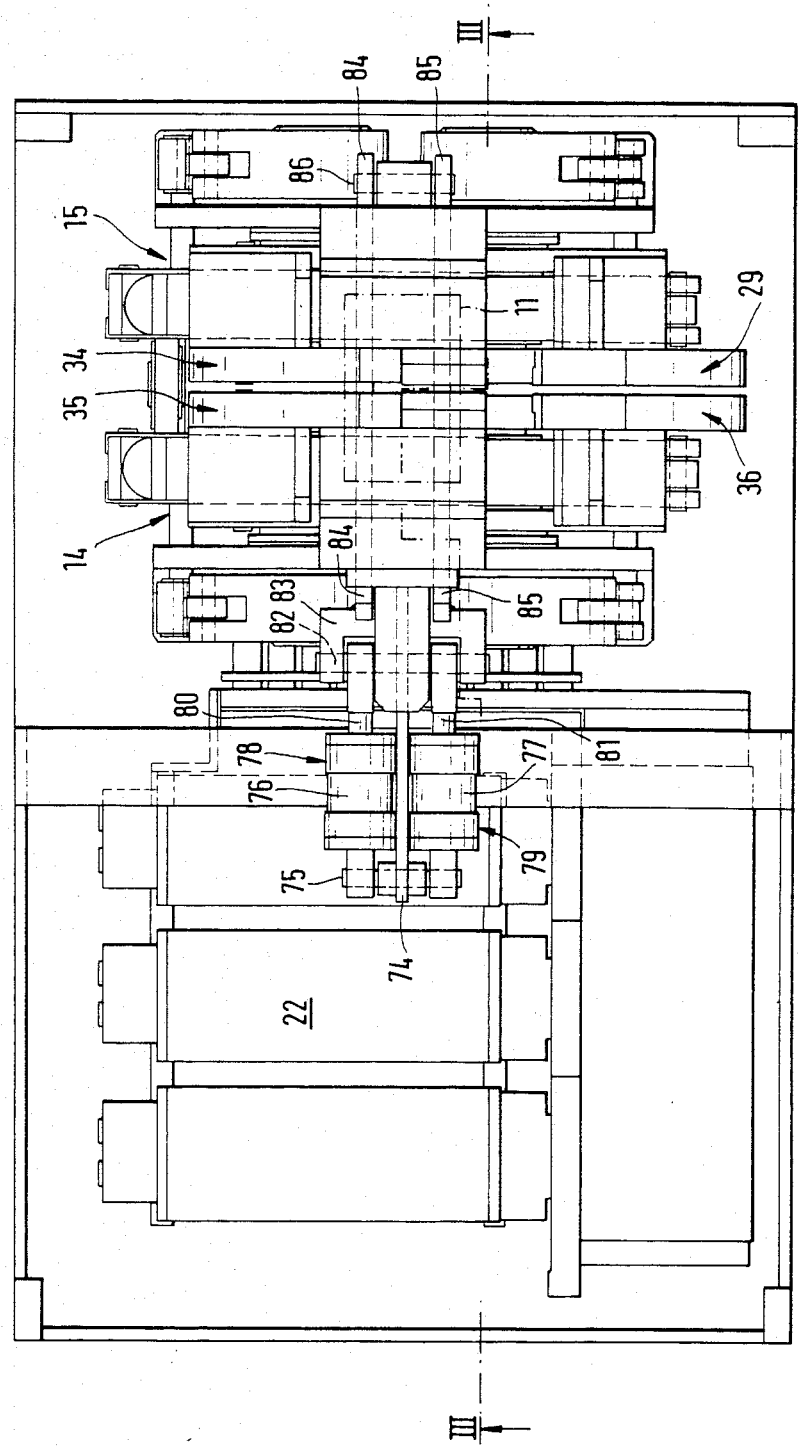
FIG. 4 schematically shows a plan view of the apparatus depicted in FIG. 3.

From FIGS. 3 and 4 it will be seen that the apparatus 10 in its essential components (except for a source of welding power or current 22) can be said to be symmetrical to a diametral plane passing through the longitudinal or axial slit 100 of the blank 11, that is, through the line I—I of FIG. 3, and extending substantially at right angles to the plane of the drawing of FIG. 3. Additionally, it will also be seen from FIGS. 1 and 2 that the essential components of the apparatus 10 are constructed mirror-symmetrical to the plane of symmetry designated by the reference character E in FIGS. 1 and 2.

The apparatus 10 possesses two clamping devices or work locating fixtures or jigs 12, 13 (cf. FIG. 3), each of which serves for the clamping of a respective one of the edge regions bordering the longitudinal or axial slit 100 of the blank 11. As will be seen the two clamping devices or work locating fixtures or jigs 12, 13 are also component parts of a means provided for pressing the mutually confronting or bordering edges of the longitudinal or axial slits 100 of the blanks 11 together before, during and after the welding process.

Each of the work locating fixtures or clamping devices 12, 13 possesses a robustly dimensioned frame 14 and 15, respectively, at each of whose upper ends there is installed a substantially planar fixed clamping jaw 16 and 17, respectively. These fixed clamping jaws 16 and 17 are each connected to the output terminals 20 and 21, respectively, of a source of welding power or current 22 through the related frame 14 and 15, respectively, and through a set of flexible conductors 18 and 19, respectively.

Each of the frames 14, 15 is penetrated by two heavy shafts, such as the shafts 23, 24 in frame 15 and located relative to a predetermined side of the fixed clamping jaws 16 and 17 (FIG. 1). These shafts 23, 24 are subdivided into various sections or regions of differing diameters. The middle section 25 of the shaft 24 (only visible in FIG. 3) is rotatably mounted in a bush or bushing 26 in frame 15. Analogous relationships are valid for the shaft 23 in frame 15. As already mentioned the frame 14 is also penetrated by two shafts, which are formed in the same way as the shafts 23, 24 but are arranged symmetrically to them with reference to the section plane I—I.

To the side of the middle section 25 of the shaft 24, nearer the plane of symmetry I—I, there is connected a one-piece or integral section or predetermined region 27 of the shaft 24 which is parallel to the axis of the shaft 24 but is eccentric to the section 25 and on which, through a bush or bushing 28, there is mounted one end 30 of a C-shaped pivotable partial jaw member 29 (cf. FIG. 1). The other end 31 of this partial jaw member 29 is provided with a clamping jaw face 32 which is complementary to the fixed clamping jaw 17. This partial jaw member 29 is paired with another pivotably mounted partial jaw member 34 which is constructed mirror-symmetrically to the plane E and is also mounted on an eccentric section 33 of the shaft 23 which is analogous to the eccentric section 27. Therefore the two partial jaw members 29 and 34 together form a movable clamping jaw which cooperates with the fixed clamping jaw 17.

Likewise there cooperates with the fixed clamping jaw 16 a further movable clamping jaw which also contains two partial jaw members 35, 36 (cf. FIG. 2). These two partial jaw members 35, 36 are constructed exactly the same as the partial jaw members 34 and 29 and are pivotably mounted on corresponding eccentric sections of the related shaft which penetrates the frame 14.

From FIG. 1 it can be seen that the partial jaw members 29 and 34 are pivotable from both sides axially into the blank 11 and from this pivoted-in position can again be pivoted out. In FIG. 1 the partial jaw member 29 is shown in the pivoted-out position and the partial jaw member 34 is shown in the pivoted-in but not clamped position. It is to be noted that the pivotal movement of all partial jaw members 29, 34 as well as 35, 36 occurs essentially simultaneously. To carry out these pivotal movements the partial jaw members 29 and 34 are articulated or hinged through a pin or shaft 37 and 38, respectively, to the end of a piston rod 39 and 40, respectively, of a preferably double-acting hydraulic actuating unit 41 and 42, respectively, whose cylinder 43 and 44, respectively, is articulated or hinged through a pin or shaft 45 and 46, respectively, to the bottom portion of the frame 15. The hydraulic actuating units 41, 42 are connected by means of not particularly shown conduits and regulating valves with a likewise not particularly shown suitable source of hydraulic pressure.

As can be seen from FIGS. 2 and 3 there are keyed to the end section 47 opposite the eccentric section 27 of the shaft 24 (and each of the corresponding remaining three shafts) heavy extension or crank arms 48 and 49, respectively (FIG. 2). At the free ends of these extension or crank arms 48 and 49 there are articulated or hinged through a pin or shaft 50 and 51, respectively, the piston rod 52 and 53, respectively, of a further, double-acting, hydraulic actuating unit 54 and 55, respectively, whose cylinder 56 and 57, respectively, is articulated or hinged through a pin or shaft 58 and 59, respectively, to the lower part of the related frame—in FIG. 2, frame 14. The hydraulic actuating units 54 and 55 are also connected by means of not particularly shown pressure conduits as well as regulating valves to a not particularly shown suitable source of pressure.

When the hydraulic actuating units 54 and 55 are subjected to pressure, then the corresponding piston rods 52 and 53, respectively, are driven from the rest or idle position shown in FIG. 2 for the piston rod 52, in which the corresponding partial jaw member 36 is not yet in its clamping position, upwards into the operative position shown in FIG. 2 for the piston rod 53. Each shaft 24 and 23 thereby is rotated by means of the corresponding extension or crank arm 48 and 49, respectively, to which it is keyed. This has the effect that the eccentric section 27 and 33 are pivoted downwards and in turn advance the respective partial jaw member 29 and 34, which is mounted on this section, toward its associated fixed clamping jaw 16 and 17, respectively, and thereby clamps the corresponding edge region of the blank 11.

From FIGS. 1 and 3 it can be seen that the two frames 14 and 15 are pivotably supported at their respective lower ends on a common pivot shaft 68 which at its end sections 64, 65, and 66, 67, respectively, carries bushes or bushings 60, 61, and 62, 63, respectively. This shaft 68 is, in turn, rotatably mounted in bearing blocks 69 which extend above a base plate 70 and such shaft is located relative to the same predetermined side of the fixed clamping jaws 17 and 18, in other words again below the fixed clamping jaws 17 and 18. There is keyed to the middle of the shaft 68 a clamp or collar 71 which possesses two extensions or crank arms 72 which engage an only schematically indicated tie rod 73. As long as the tie rod 73 is not axially moved the shaft 68 is prevented from turning.

The end sections 66, 67 are exactly coaxial to the main body of the shaft 68, whereas the sections 64, 65, to which the frame 14 is articulated or hinged are slightly eccentric in relation to the end sections 66, 67, which eccentricity can be seen in FIG. 3. Thus, an axial displacement of the tie rod 73 allows the pivot axis of the frame 14 to be slightly displaced in relation to that of the frame 15.

This has the result that the frames 14, 15, together with the work locating fixtures or clamping devices 12, 13 which are completely supported on them, can be limitedly pivoted towards each other and away from each other. To this end there are articulated or hinged to both sides of an extension or crank arm 74 (cf. FIGS. 2, 3), which extends away from the frame 14, and by means of a journal pin or shaft 75, two cylinders 76 and 77 (cf. FIG. 4) of two double-acting hydraulic actuating units or piston and cylinder mechanisms 78 and 79, respectively, whose piston rods or translatable members 80 and 81, respectively, are articulated or hinged by means of a common pivot pin or shaft 82 to a heavy shackle 83. From shackle 83 there extend outwards two tie or connecting rods 84, 85 which (as can be seen from FIGS. 1 and 2) are carried through corresponding apertures in the frames 14 and 15 with play. The free end of each of these tie rods 84, 85 is, as can be seen from FIGS. 3 and 4, articulated or hinged by means of a common pivot pin or shaft 86 to the side of the frame 15 remote from the plane I—I.

The shackle 83 articulated or hinged to the piston rods 80 and 81 also possesses an extension or crank arm 87 which extends downwards and at whose one end there is articulated or hinged a rocking lever or rocker arm 88. The other end of the rocker arm 88 is, by means of a shackle 89, articulated or hinged to the side of the frame 14 remote from the section plane I—I.

This has the result that when the hydraulic actuating units 78 and 79 are loaded in the sense that the piston rods 80 and 81, respectively, are retracted, the two frames 14 and 15, respectively, with their associated clamping devices or work locating fixtures or jigs 12 and 13, respectively, are pivoted toward each other by the same amount due to the rocker arm 88. Since this amount, measured in the region of the fixed clamping jaws 16 and 17 amounts to only a few millimeters, namely until the edges at the longitudinal or axial slit 100 of the blank 11 are pressed against each other, this movement, although strictly speaking a circular movement around the shaft 68, can for practical purposes be considered to be a linear or straight-line movement.

With the described apparatus it is possible to exert, in the two clamping devices or work locating fixtures or jigs 12 and 13, clamping forces in the region of 50 tons and also with the same clamping devices or work locating fixtures or jigs 12 and 13 to exert compressive forces up to about 35 tons, while elastic deformations of the fixed clamping jaws 16 and 17 as well as of the partial jaw members 29, 34 and 35, 36, respectively, associated with these fixed clamping jaws 16 and 17, respectively, remain practically negligible despite such high forces.

After the subsequent welding operation, the wheel rim hoops are carried by means of the already mentioned although not particularly shown conveying or transport device to a straightening and deburring station 90 which is shown in FIG. 3 only schematically with dotted lines, in which the welded joint is smoothed by machining on the inside as well as on the outside surface or circumference.

Subsequently the finished wheel rim hoops are conducted to a number of rolling stations in which the profile of the finished wheel rim is then rolled in the usual manner.

While there are shown and described present preferred embodiments of the invention, it is to be distinctly understood that the invention is not limited thereto, but may be otherwise variously embodied and practiced within the scope of the following claims.

Accordingly, what I claim is:

1. An apparatus for butt-welding axially slit, hollow cylindrical blanks each having two sides in order to form wheel rim hoops, comprising:
   means for pressing together mutually confronting edges of an axial slit of a hollow cylindrical blank;
   clamping devices associated with each region of the hollow cylindrical blank adjoining the axial slit for fixedly clamping each said region and for conducting an electrical welding current to each said region;

each clamping device of said clamping devices comprising a fixed first clamping jaw and a moveable second clamping jaw;

a source of electrical welding current;

said fixed first clamping jaw being connected to said source of electrical welding current;

each hollow cylindrical blank having an inner circumference and two sides;

said moveable second clamping jaw being intended to engage one hollow cylindrical blank at a time at said inner circumference;

said moveable second clamping jaw being moveable toward and away from said fixed first clamping jaw;

each said movable second clamping jaw comprising two partial jaw members;

said two partial jaw members having a substantially pincer-like configuration;

respective means for axially pivoting each of said two partial jaw members of each clamping device into said inner circumference of each hollow cylindrical blank from both of said two sides thereof with a pivoting motion;

respective means for imparting a substantially straight advance motion to each of said two partial jaw members of each clamping device toward said associated fixed first clamping jaw; and said pivoting motion being independent of said substantially straight advance motion of said two partial jaw members toward said associated fixed first clamping jaw.

2. An apparatus for butt-welding axially slit, hollow cylindrical blanks each having two sides in order to form wheel rim hoops, comprising:

means for pressing together mutually confronting edges of an axial slit of a hollow cylindrical blank;

clamping devices associated with each region of the hollow cylindrical blank adjoining the axial slit for fixedly clamping each said region and for conducting an electrical welding current to each said region;

each clamping device of said clamping devices comprising a fixed first clamping jaw and a moveable second clamping jaw;

a source of electrical welding current;

said fixed first clamping jaw being connected to said source of electrical welding current;

each hollow cylindrical blank having an inner circumference and two sides;

said moveable second clamping jaw being intended to engage one hollow cylindrical blank at a time at said inner circumference;

said moveable second clamping jaw being moveable toward and away from said fixed first clamping jaw;

each said moveable second clamping jaw comprising two partial jaw members;

said two partial jaw members having a substantially pincer-like configuration;

respective means for axially pivoting each of said two partial jaw members of each clamping device into said inner circumference of each hollow cylindrical blank from both of said two sides thereof with a pivoting motion;

respective means for imparting a substantially straight advance motion to each of said two partial jaw members of each clamping device toward said associated fixed first clamping jaw;

said pivoting motion being independent of said substantially straight advance motion of said two partial jaw members toward said associated fixed first clamping jaw;

said means for imparting said substantially straight advance motion to said two partial jaw members of each clamping device toward said associated fixed first clamping jaw comprising:

two shafts;

two protruding arms;

two first extensible elements;

each shaft of said two shafts having an axis and a predetermined region arranged eccentrically with respect to said axis;

each protruding arm of said two protruding arms having a predetermined end;

said two partial jaw members being mutually axially symmetrical;

each partial jaw member of said two partial jaw members being rotatably journaled on said predetermined region of an associated one of said two shafts;

each said protruding arm being keyed to an associated one of said two shafts; and each first extensible element of said two first extensible elements engaging said predetermined end of an associated one of said protruding arms for effecting said substantially straight advance motion of said two partial jaw members toward said fixed first clamping jaw.

3. The apparatus as defined in claim 2, wherein:

said means for axially pivoting said two partial jaw members of each clamping device into said inner circumference of each hollow cylindrical blank from both of said two sides thereof with a pivoting motion comprises:

two second extensible elements;

each second extensible element of said two second extensible elements being coupled with an associated one of said two partial jaw members; and each said associated one of said two partial jaw members being pivotable by means of each said second extensible element about said predetermined eccentric region of an associated one of said two shafts.

4. An apparatus for butt-welding axially slit, hollow cylindrical blanks each having two sides in order to form wheel rim hoops, comprising:

means for pressing together mutually confronting edges of an axial slit of a hollow cylindrical blank;

clamping devices associated with each region of the hollow cylindrical blank adjoining the axial slit for fixedly clamping each said region and for conducting an electrical welding current to each said region;

each clamping device of said clamping devices comprising a fixed first clamping jaw and a moveable second clamping jaw;

a source of electrical welding current;

said fixed first clamping jaw being connected to said source of electrical welding current;

each hollow cylindrical blank having an inner circumference and two sides;

said moveable second clamping jaw being intended to engage one hollow cylindrical blank at a time at said inner circumference;

said moveable second clamping jaw being moveable toward and away from said fixed first clamping jaw;

each said moveable second clamping jaw comprising two partial jaw members;

said two partial jaw members having a substantially pincer-like configuration;

respective means for axially pivoting each of said two partial jaw members of each clamping device into said inner circumference of each hollow cylindrical blank from both of said two sides thereof with a pivoting motion;

respective means for imparting a substantially straight advance motion to each of said two partial jaw members of each clamping device toward said associated fixed first clamping jaw;

said pivoting motion being independent of said substantially straight advance motion of said two partial jaw members of each clamping device toward said associated first clamping jaw;

two frames;

a common pivot shaft;

each said partial jaw member having a pivot axis;

said common pivot shaft crossing said pivot axis of said two partial jaw members at substantially right angles;

each clamping device of said clamping devices being mounted with said fixed first clamping jaw and said moveable second clamping jaw on an associated one of said two frames;

both frames of said two frames being hingedly connected on said common pivot shaft; and both of said two frames being counter-rotatively pivotable toward and away from one another.

5. The apparatus as defined in claim 4, wherein:

each said fixed first clamping jaw has a predetermined side in relation to which said two partial jaw members are pivotably journaled; and said common pivot shaft also being arranged on said predetermined sides of said fixed first clamping jaw.

6. The apparatus as defined in claim 5, wherein:

said means for pressing together mutually confronting edges of an axial slit of a hollow cylindrical blank comprising:

two piston and cylinder mechanisms;

two connecting rods;

a stationarily journaled rocking lever;

each said piston and cylinder mechanism of said two piston and cylinder mechanisms being hingedly connected at said first end to a first frame of said two frames;

each piston and cylinder mechanism comprising a translatable member; and each said translatable member being coupled to a second one of said two frames by said connecting rod and by said stationarily journaled rocking lever.

* * * * *